United States Patent
Kell et al.

(10) Patent No.: US 9,737,961 B2
(45) Date of Patent: Aug. 22, 2017

(54) BOROSCOPE

(71) Applicant: ROLLS-ROYCE PLC, London (GB)

(72) Inventors: James Kell, Nottingham (GB); Clive Grafton-Reed, Leicester (GB); Dragos Axinte, Nottingham (GB)

(73) Assignee: ROLLS-ROYCE plc, London (GB)

( * ) Notice: Subject to any disclaimer, the term of this patent is extended or adjusted under 35 U.S.C. 154(b) by 987 days.

(21) Appl. No.: 13/967,750

(22) Filed: Aug. 15, 2013

(65) Prior Publication Data

US 2014/0076864 A1    Mar. 20, 2014

(30) Foreign Application Priority Data

Sep. 19, 2012    (GB) .................................. 1216703.7

(51) Int. Cl.
*B23K 26/00*    (2014.01)
*B23K 26/342*    (2014.01)
(Continued)

(52) U.S. Cl.
CPC ........ *B23K 26/342* (2015.10); *B23K 26/0006* (2013.01); *B23K 26/0066* (2013.01); *B23K 26/0096* (2013.01); *B23K 26/064* (2015.10); *B23K 26/08* (2013.01); *B23K 26/211* (2015.10); *B23K 26/32* (2013.01); *B23K 35/0244* (2013.01); *B23K 35/3033* (2013.01);
(Continued)

(58) Field of Classification Search
CPC ........................... G02B 23/2423; G02B 26/101
USPC ....... 600/473, 431, 475, 476, 433, 310, 342, 600/109, 160, 180; 219/121.64, 121.6, 219/121.85, 121.79, 383; 250/235
See application file for complete search history.

(56) References Cited

U.S. PATENT DOCUMENTS 3,449,542 A    6/1969    Conner et al.
3,796,220 A    3/1974    Bredemeier
(Continued)

FOREIGN PATENT DOCUMENTS

EP    2 033 572 A2    3/2009
JP    A-06-063787    3/1994
(Continued)

OTHER PUBLICATIONS

Search Report issued in British Application No. 1216703.7 dated Jan. 25, 2013.
(Continued)

*Primary Examiner* — Phuong Nguyen
(74) *Attorney, Agent, or Firm* — Oliff PLC (57) ABSTRACT

A boroscope includes a working head having first and second ends. A first optical fiber extends through the boroscope to a position between the first and second ends. A second optical fiber extends through the boroscope to the second end of the working head. A laser optical fiber extends through the boroscope. At least one lens is arranged between the first end and the second end of the working head and a mirror is gimballed to the second end of the working head. The laser optical fiber directs laser light transmitted through the laser optical fiber onto the lens and then onto the mirror. A first LED is arranged at a position between the first end and the second end of the working head and a second LED is arranged at the second end of the working head and an actuator devices adjust the position of the mirror.

15 Claims, 3 Drawing Sheets

(51) Int. Cl.
| | |
|---|---|
| *B23K 26/08* | (2014.01) |
| *B23K 35/30* | (2006.01) |
| *B23K 35/365* | (2006.01) |
| *B23K 35/02* | (2006.01) |
| *B23K 26/32* | (2014.01) |
| *B23K 26/064* | (2014.01) |
| *B23K 26/211* | (2014.01) |
| *B08B 7/00* | (2006.01) |
| *G02B 23/24* | (2006.01) |
| *G02B 26/10* | (2006.01) |
| *B23K 101/00* | (2006.01) |
| *B23P 6/00* | (2006.01) |
| *B23K 101/34* | (2006.01) |
| *B23K 103/08* | (2006.01) |
| *B23K 103/02* | (2006.01) |
| *B23K 103/18* | (2006.01) |

(52) U.S. Cl.
CPC ...... *B23K 35/3046* (2013.01); *B23K 35/3053* (2013.01); *B23K 35/365* (2013.01); *B08B 7/0042* (2013.01); *B23K 2201/001* (2013.01); *B23K 2201/34* (2013.01); *B23K 2203/02* (2013.01); *B23K 2203/08* (2013.01); *B23K 2203/26* (2015.10); *B23P 6/002* (2013.01); *G02B 23/2423* (2013.01); *G02B 26/101* (2013.01)

(56) References Cited

U.S. PATENT DOCUMENTS

| | | |
|---|---|---|
| 4,976,528 A | 12/1990 | Cuda |
| 5,339,152 A | 8/1994 | Horn |
| 6,192,267 B1 | 2/2001 | Scherninski et al. |
| 6,542,230 B1 | 4/2003 | Luke |
| 6,759,627 B2 | 7/2004 | Kilburn |
| 2004/0175686 A1* | 9/2004 | Ono ............... A61L 27/443 434/274 |
| 2004/0262507 A1* | 12/2004 | Kikuchi ............ G02B 23/2423 250/235 |
| 2005/0058352 A1* | 3/2005 | Deliwala ............ G01J 3/02 382/232 |
| 2006/0042083 A1 | 3/2006 | Baker et al. |
| 2012/0041267 A1* | 2/2012 | Benning ............ A61B 1/0607 600/180 |
| 2012/0062724 A1* | 3/2012 | Yokota ............ A61B 1/00009 348/82 |

FOREIGN PATENT DOCUMENTS

| | | |
|---|---|---|
| WO | WO 99/00642 A1 | 1/1999 |
| WO | WO 03/071333 A1 | 8/2003 |

OTHER PUBLICATIONS

Nov. 25, 2013 European Search Report issued in European Application No. 13 18 0523.

Search Report issued in British Application No. GB1314607.1 issued Jan. 28, 2014.

* cited by examiner

BOROSCOPE

The present invention relates to a boroscope and a method of laser processing a component within an assembled apparatus and in particular relates to a flexible boroscope and a method of laser processing a component within an assembled apparatus using a flexible boroscope.

Currently boroscopes are used to view internal components within an assembled gas turbine engine, or other engine, machine, apparatus etc, to determine if the components within the gas turbine engine are damaged and need repair or replacement or if they are undamaged and do not require repair or replacement. The use of boroscopes enables the components within the gas turbine engine, or other engine, machine, apparatus etc, to be viewed without having to disassemble the gas turbine engine into modules or sub modules.

There are two types of boroscopes, e.g. rigid boroscopes and flexible boroscopes. Rigid boroscopes are inserted into an assembled apparatus through an aperture in a casing to enable components within line of sight to be viewed. Flexible boroscopes are also inserted into an assembled apparatus through an aperture in the casing and the boroscope may be continuously inserted and manoeuvred so that components deeper within the apparatus, and not within line of sight, of the aperture may be viewed.

The flexible boroscopes are manoeuvred, or controlled, using cables within the boroscope which are pulled by motors in the control unit of the flexible boroscope.

It has been proposed to provide a suitable optical fibre which extends through the full length of the flexible boroscope so that a laser beam may transmitted through the optical fibre and be used to process components within the gas turbine engine, other engine, machine, apparatus etc, e.g. to laser clean a dirty component, to laser machine a damaged component or to deposit material to repair a damaged component.

However, the use of an optical fibre to transmit a laser beam within a flexible boroscope as mentioned above to carry out these processes is not suitable because the use of the cables pulled by the motors to position the flexible boroscope to carry out laser processing are slow to respond and do not give sufficient accuracy.

Accordingly the present invention seeks to provide a boroscope which reduces, preferably overcomes, the above mentioned problems.

Accordingly the present invention provides a boroscope comprising a working head, the working head having a first end and a second end, a first optical fibre extending through the boroscope to a position between the first end and the second end of the working head, a second optical fibre extending through the boroscope to the second end of the working head, a laser optical fibre extending through the boroscope, a mirror adjustably mounted on the working head, the laser optical fibre being arranged to direct laser light transmitted through the laser optical fibre onto the mirror on the working head, a first light source arranged at a position between the first end and the second end of the working head, a second light source arranged at the second end of the working head, and an actuator device to adjust the position of the mirror.

At least one lens may be arranged between the first end and the second end of the working head, the laser optical fibre being arranged to direct laser light transmitted through the laser optical fibre onto the at least one lens within the working head and then onto the mirror on the working head. The mirror may be adjustably mounted to the second end of the working head.

The boroscope may comprise a flexible hollow member having a first end and a second end, the working head being arranged at the second end of the hollow member, the first end of the working head being arranged adjacent the second end of the hollow member and the second end of the working head being arranged remote from the hollow member, the first optical fibre extending through the hollow member from the first end of the hollow member to the position between the first end and the second end of the working head, the second optical fibre extending through the hollow member and the working head from the first end of the hollow member to the second end of the working head, the laser optical fibre extending through the hollow member from the first end to the second end of the hollow member.

Preferably the first light source is arranged to direct light with a component of direction transverse to the axis of the boroscope, the end of the first optical fibre is arranged to receive light travelling with a component of direction transverse to the axis of the boroscope, the second light source is arranged to direct light with a component of direction parallel to the axis of the boroscope and the end of the second optical fibre is arranged to receive light travelling with a component of direction parallel to the axis of the boroscope.

Preferably the first light source and/or the second light source comprise a light emitting diode.

The adjustable mounting may be arranged to change the angle of the mirror relative to the axis of the at least one lens. The adjustable mounting may comprises two perpendicular axes of rotation and the mirror is rotatable about the two axes of rotation.

The mirror may be adjustably mounted on the second end of the working head by a gimballed mounting. The actuator device may comprise a galvanometer mechanism.

The mirror may be adjustably mounted on the second end of the working head by a micro-electro-mechanical system and the actuator device comprises the micro-electro-mechanical system.

Preferably a pipe extends through the boroscope to a position between the first and second ends of the working head and a device is arranged to supply powder material through the pipe.

The first optical fibre may surround the laser optical fibre to provide a cladding for the laser optical fibre.

Preferably the working head comprises a first cylindrical portion at the first end of the working head, a second part cylindrical portion at the second end of the working head and a third portion interconnecting the first cylindrical portion and the second part cylindrical portion.

Preferably the first light source and the at least one lens are arranged in the first cylindrical portion, the second light source and the mirror are arranged on the second part cylindrical portion.

The present invention also provides a method of laser processing a component within an assembled apparatus, the apparatus comprising a casing enclosing the component, the casing having at least one aperture extending there-through, the method comprising:—
 a) inserting a boroscope through the aperture, the boroscope comprising a working head, the working head having a first end and a second end, a first optical fibre extending through the boroscope to a position between the first end and the second end of the working head, a second optical fibre extending through the boroscope to the second end of the working head, a laser optical fibre extending through the boroscope, a mirror adjustably mounted on the working head, the laser optical fibre being arranged to direct laser light transmitted through the laser optical fibre onto the mirror on the working head, a first Light source arranged at a position between the first end and the second end of the working head, a second light source arranged at the second end of the working head and an actuator device to adjust the position of the mirror, b) viewing the assembled apparatus within the casing using the second optical fibre, c) viewing the assembled apparatus within the casing using the second optical fibre while moving the working head of the boroscope to the component, d) transmitting a laser beam through the laser optical fibre to the mirror, e) reflecting the laser beam off the mirror onto a surface of the component to process the surface of the component, and f) viewing the surface of the component and the laser beam with the first optical fibre to monitor the processing of the surface of the component.

Step e) may comprise adjusting the position of the mirror to move the laser beam over the surface of the component.

Step e) may comprise cleaning the surface of the component.

The boroscope may comprise a pipe extending through the baroscope to a position between the first and second ends of the working head and a device is arranged to supply powder material through the pipe, and step e) comprises supplying a powder material through the pipe onto the surface of the component and melting the powder material with the laser beam.

Step e) may comprise supplying a welding material to weld the component, to repair a crack in the component, to weld the component to another component or to build up a worn portion of the component.

Step e) may comprise supplying a coating material to provide a coating on the component or to repair a coating on the component.

The assembled apparatus may comprise a gas turbine engine. The component may comprise a compressor blade, a compressor vane, a turbine blade or a turbine vane.

The present invention will be more fully described by way of example with reference to the accompanying drawings, in which.

Figure 1:
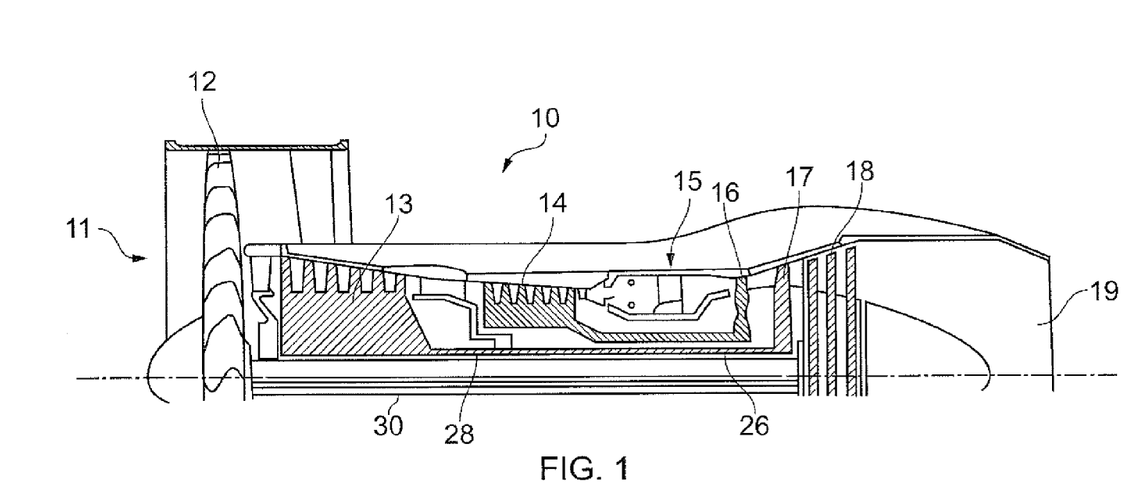
FIG. 1 is cut-away view of a turbofan gas turbine engine.

A turbofan gas turbine engine 10, as shown in FIG. 1, comprises in flow series an intake 11, a fan 12, an intermediate pressure compressor 13, a high pressure compressor 14, a combustor 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustor 15. Fuel is injected into the combustor 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
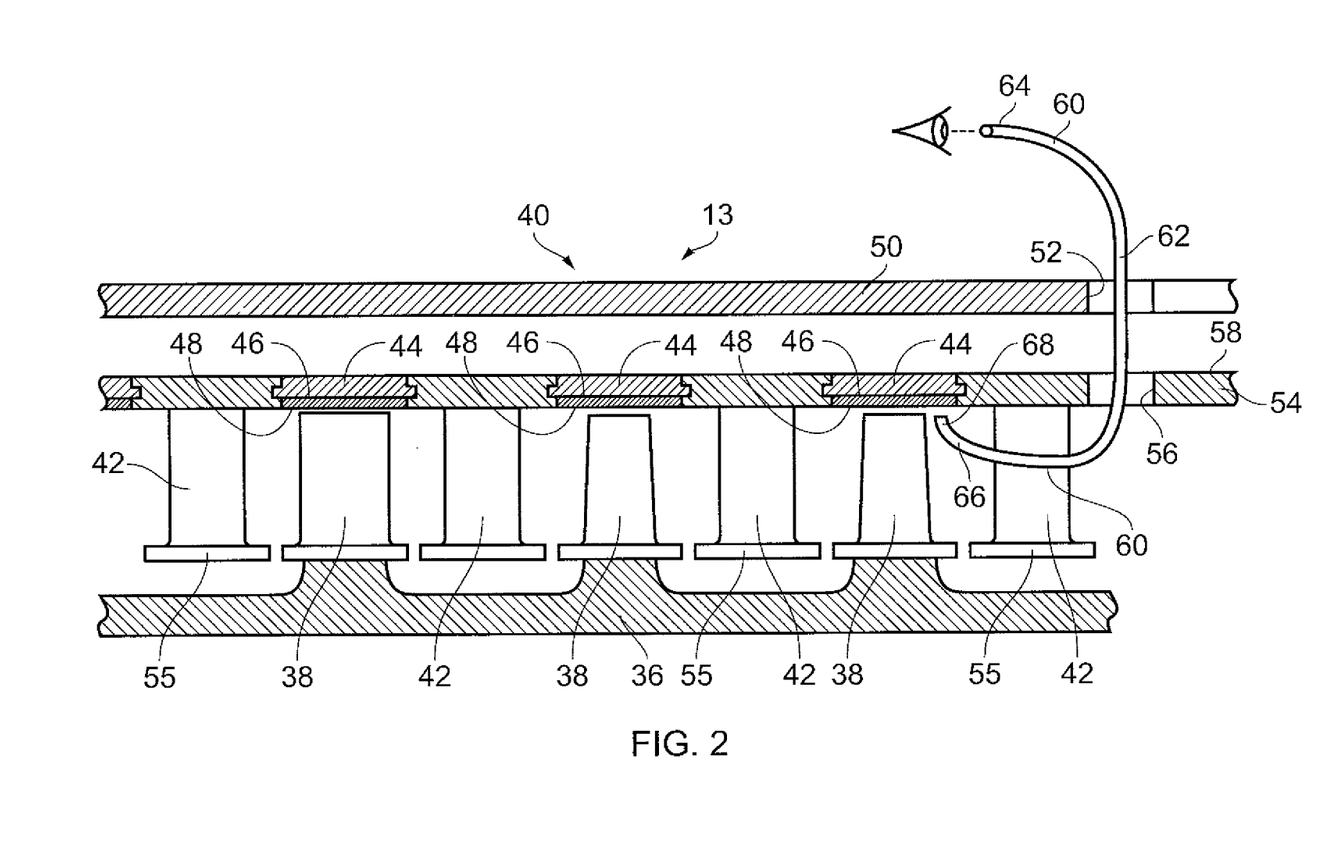
FIG. 2 is an enlarged cross-sectional view through a compressor of the turbofan gas turbine engine showing use of a boroscope of the present invention.
Figure 3:
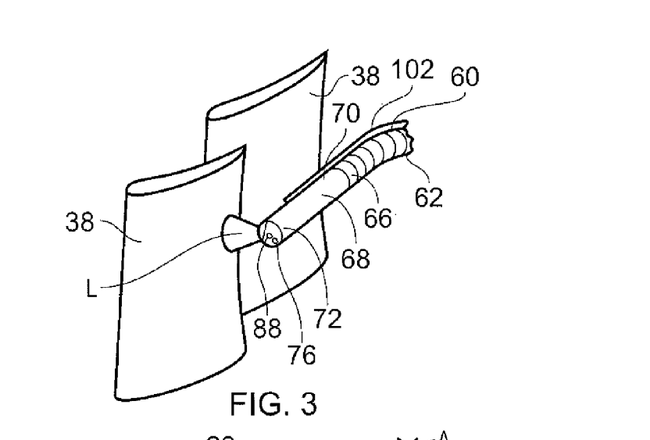
FIG. 3 is a further enlarged perspective view of a working head of the boroscope within the compressor of the turbofan gas turbine engine.
Figure 4:
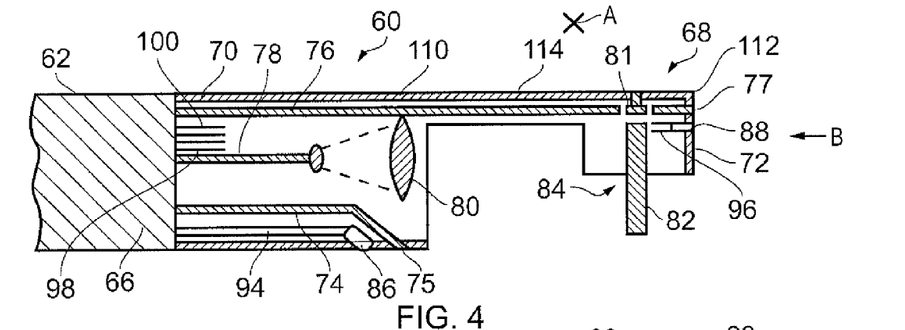
FIG. 4 is a further enlarged cross-sectional view of the working head of the boroscope shown in FIG. 3.
Figure 5:
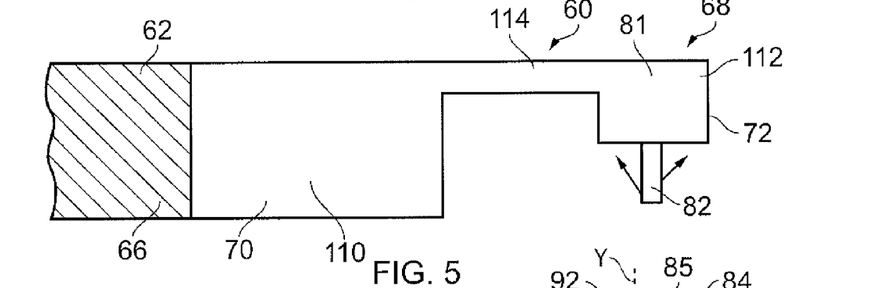
FIG. 5 is a view of the working head of the boroscope in the direction of arrow A in FIG. 4.
Figure 6:
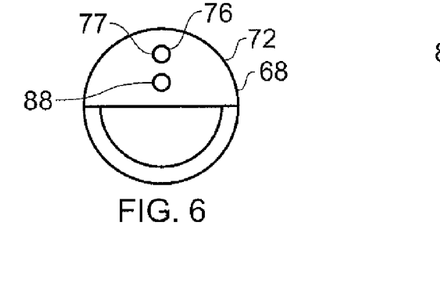
FIG. 6 is a view of the working head of the boroscope in the direction of arrow B in FIG. 4.
Figure 7:
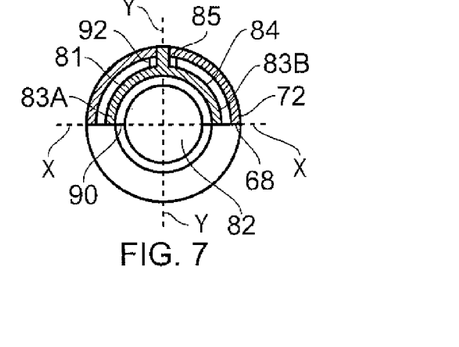
FIG. 7 is a view of the working head of the boroscope in the direction of arrow B in FIG. 4 with the end of the working head cut away.

The intermediate pressure compressor 13, as shown more clearly in FIG. 2, comprises a rotor 36 carrying a plurality of stages of compressor rotor blades 38 and a stator 40 carrying a plurality of stages of compressor stator vanes 42. The compressor rotor blades 38 in each stage are circumferentially spaced and extend generally radially outwardly from the rotor 36. The compressor stator vanes 42 in each stage are circumferentially spaced and extend generally radially inwardly from the stator 40. The stator 40 also comprises a plurality of shrouds 44 axially interconnecting the stages of compressor stator vanes 42 and the shrouds 44 are positioned radially around a corresponding one of the stages of compressor rotor blades 38. The stator 40 of the intermediate pressure compressor 28 also comprises an outer compressor casing 50 and the outer compressor casing 50 is provided with one or more apertures 52 to allow access for boroscopes and/or repair devices. In addition the radially outer platforms 54 of one or more of the compressor stator vanes 42 have one or more apertures 56 to allow access for boroscopes and/or repair devices. The shrouds 44 axially interconnecting the stages of compressor stator vanes 42 form a portion of an inner compressor casing 58. The compressor stator vanes 42 also have radially inner platforms 55.

A boroscope 60, as shown in FIGS. 3 to 7, comprises a flexible hollow member 62 having a first end 64 and a second end 66. A working head 68 is arranged at the second end 66 of the hollow member 62 and the working head 68 has a first end 70 adjacent the second end 66 of the hollow member 62 and a second end 72 remote from the second end 66 of the hollow member 62. The first end 70 of the working head 68 is immediately next to and attached to the second end 66 of the hollow member 62. A first optical fibre 74 extends through the hollow member 62 from the first end 64 of the hollow member 62 to a position between the first end 70 and the second end 72 of the working head 68. A second optical fibre 76 extends through the hollow member 62 and the working head 68 from the first end 64 of the hollow member 62 to the second end 72 of the working head 68. A third optical fibre 78 extends through the hollow member 62 from the first end 64 to the second end 66 of the hollow member 62. The third optical fibre 76 is suitable for conducting a laser beam there-through. At least one lens 80 is arranged between the first end 70 and the second end 72 of the working head 68 and a mirror 82 is supported at the second end 72 of the working head 68 by a gimballed mounting 84 to the second end 72 of the working head 68.

The third optical fibre 78 is arranged to direct laser light L transmitted through the third optical fibre 78 onto the at least one lens 80 within the working head 68 and then through the at least one lens 80 onto the mirror 82 at the second end 72 of the working head 68. A first light source 86 is arranged at a position between the first end 70 and the second end 72 of the working head 68 and a second light source 88 is arranged at the second end 72 of the working head 68. Actuator devices 90 and 92 are arranged to adjust the position of the mirror 82.

The first light source 86 is arranged to direct light with a component of direction transverse to the axis of the boroscope 60 and is arranged to direct light with a component of direction parallel to the axis of the boroscope 60. The end 75 of the first optical fibre 74 is arranged to receive light travelling with a component of direction transverse to the axis of the boroscope 60. The second light source 88 is arranged to direct light with a component of direction parallel to the axis of the baroscope 60 and the end 77 of the second optical fibre 76 is arranged to receive light travelling with a component of direction parallel to the axis of the boroscope 60.

The first light source 86 and/or the second light source 88 comprise light emitting diodes, but other suitable light sources may be used, and electrical cables 94 and 96 extend through the hollow member 62 from the first end 64 of the hollow member 62 to the first and second light sources 86 and 88 respectively. The actuator devices 90 and 92 comprise galvanometer mechanisms to rotate the mirror 82 about one or the other or both of the axes of rotation X and Y of the gimballed mounting 84 and electrical cables 98 and 100 extend through the hollow member 62 from the first end 62 to the actuator devices 90 and 92 respectively. The gimballed mounting 84 is arranged to change the angle of the mirror 82 relative to the axis of the at least one lens 80.

A pipe 102 extends through the hollow member 62 from the first end 64 of the hollow member 62 to a position between the first and second ends 70 and 72 respectively of the working head 68 and a device 104 is arranged to supply suitable material, e.g. powder material or solid material for example a wire, through the pipe 102. Alternatively the pipe 102 may be secured to the hollow member 62.

The working head 68 generally comprises a first cylindrical portion 110 at the first end 70 of the working head 68, a second part cylindrical portion 112 at the second end 72 of the working head 68 and a third portion 114 interconnecting the first cylindrical portion 110 and the second part cylindrical portion 112. The first light source 86, the end 75 of the first optical fibre 74 and the at least one lens 80 are arranged in the first cylindrical portion 110 of the working head 68. The second light source 88, the end 77 of the second optical fibre 76 and the mirror 82 are arranged in, or on, the second part, half, cylindrical portion 112. In particular the mirror 82 is supported on the second part cylindrical portion 112 by the gimballed mounting 84.

The gimballed mounting 84 comprises two perpendicular axes of rotation X and Y. The mirror 82 is circular and the gimballed mounting 84 comprises a C-shaped, or U-shaped, member 81. The mirror 82 is rotatably mounted about one of its diameters, the axis of rotation axis X, between the ends of the limbs 83A and 83B of the C-shaped member 81. The trough 85 of the C-shaped member 81 is rotatably mounted to the second part cylindrical portion 112 at the second end 72 of the working head 68 about the axis of rotation Y.

The working head 68 has a diameter of approximately 9 mm and the working head is made from a suitable metal or alloy, for example aluminium, aluminium alloy, titanium, titanium alloy, steel, nickel or nickel alloy. The lens 80 has a specific focal length, but the focal length may be altered depending on how much space is available within the gas turbine engine 10 and the focal length is expected to be between and including 20 and 100 mm to account for the mirror 82. The mirror 82 is mounted by the gimballed mounting 84 so that two dimensional profiles of the laser beam L may be directed onto the surface of the component. The working envelope, the shape and area, of the laser beam L on the component depends upon the distance between the mirror 82 and the component. The greater the distance between the mirror 82 and the component, the greater is the area of the envelope. The angle at which the laser beam L strikes the component determines the shape of the envelope.

In operation the boroscope 60 is inserted through an aperture 52 in the outer compressor casing 50 and through an aperture 56 in the inner compressor casing 58. The baroscope 60 is then manipulated so that the working head 68 is in proximity to a component, e.g. a rotor blade 38, a stator vane 42 or other component, which has been damaged. The working head 68 of the boroscope 60, as mentioned above, is provided with two light sources 86 and 88 and with respective associated optical fibres 74 and 76. The second optical fibre 76 and the second light source 88 enable an operator to view in a forward direction, parallel to the axis or longitudinal direction, of the hollow member 62 of the boroscope 60 so that the operator is able to position the working head 68 of the boroscope 60 at the required location within the gas turbine engine 10 and with respect to the component which has been damaged. Thus, the operator uses the second optical fibre 76 to view the assembled gas turbine engine 10 within the outer compressor casing 50 and the inner compressor casing 58 of the gas turbine engine 10 using the second optical fibre 76 while moving the working head 68 of the boroscope 60 to the component. The first optical fibre 74 and the first light source 86 enable the operator to view in a sideways direction, transverse to the axis or longitudinal direction, of the hollow member 62 of the boroscope 60 so that the operator is able to monitor the operation and working of the laser. The gimballed mounting 84 of the mirror 82 is used to direct the laser beam from the third optical fibre 78 and lens 80 onto the surface of the component. The galvanometer mechanisms 90 and 92 enable the mirror 82 to be operated sufficiently quickly to provide laser processing of the surface of the component. The galvanometer mechanisms 90 and 92 are operated to move the mirror 82 about one or both of the axes of rotation X and Y to move the point, or area, of contact of the laser beam over the surface of the component to process as much or as little of the surface of the component as is required without having to move the working head 68. Rotation of the mirror 82 about the axis of rotation X moves the point, area, of contact of the laser beam generally longitudinally with respect to the boroscope 60 whereas rotation of the C-shaped member about the axis of rotation Y moves the point, area, of contact of the laser beam generally transversely with respect to the boroscope 60. Thus the gimballed mounting 84 provides an adjustable mounting which is arranged to change the angle of the mirror 82 relative to the axis of the at least one lens 80. The adjustable mounting, the gimballed mounting, 84 comprises two perpendicular axes of rotation X and Y and the mirror 82 is rotatable about the two axes of rotation X and Y.

The laser beam may be used alone to clean the surface of a component. The laser beam may be used in conjunction with a supply of suitable material through the pipe 102. The pipe 102 may be arranged to supply welding material, metal or alloy, into the laser beam to weld a component, to repair a crack in the component, or to weld two components together etc. The pipe 102 may be arranged to supply welding material, metal or alloy, into the laser beam to provide a weld deposit on the component to build up a worn portion of the component. The welding material in these two examples may be in the form of a solid material, e.g. welding wire. The pipe 102 may supply coating material, metal or alloy or ceramic, to provide or repair a coating on the component. The coating material may be a MCrAlY powder where M is Ni, Co, Fe or a mixture of one or more of Ni, Co and Fe. The coating material may be NiAl powder or a mixture of Ni and Al powders to form a beta nickel aluminide coating or PtNiAl powder or a mixture of Pt, Ni and Al powders to form a beta platinum modified nickel aluminide coating. The laser beam is used to provide direct laser deposition process to provide or repair the coating. The coating material may be a mixture of zirconia and yttria powders or a mixture of zirconia and one or more other stabilising oxide powders to form a thermal barrier coating. The pipe 102 may be used to supply a metal coating, e.g. MCrAlY, NiAl or PtNiAl as discussed above, to provide a bond coating and then supply a ceramic coating, e.g. zirconia and yttria as discussed above, a thermal barrier coating.

The laser beam is reflected off the mirror onto the surface of the component during the processing of the surface of the component. In the case of cleaning of the surface of the component the laser beam is defocused using the lens or lenses so that the laser beam is spread over a large area. In the case of repairing the component the laser beam is focused using the lens or lenses so that the laser beam is concentrated on a smaller area than for cleaning to heat and/or melt the surface of the component and melt the welding material supplied into the laser beam so that the welding material fills the crack in the surface of the component or builds up on a worn portion of the surface of the component. If the component has a coating the surface of the coating forms the surface of the component and the laser beam is reflected onto the surface of the coating on the component. The laser beam may thus be used to clean or repair the coating in a similar manner to that described above for a component without a coating except that a coating material is supplied into the laser beam rather than a welding material, e.g. to fill a crack in the coating or build up a worn portion of the surface of the coating. If the component does not have a coating, the component may be provided with a coating by reflecting the laser beam onto the surface of the coating and supplying coating material into the laser beam to build up the coating on the surface of the component.

Figure 8:
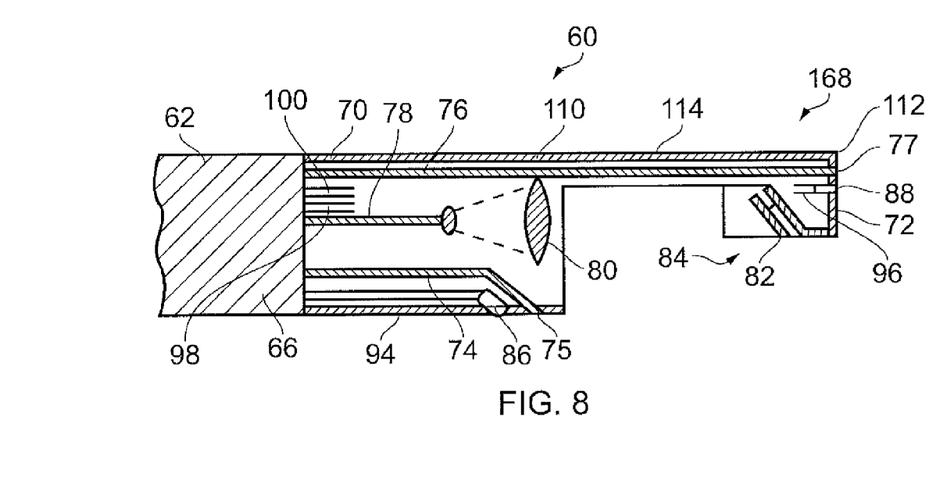
FIG. 8 is a further enlarged cross-sectional view of an alternative working head of the boroscope shown in FIG. 3.

A boroscope 160 with an alternative working head 168 is shown in FIG. 8. The baroscope 160 and working head 168 are substantially the same as that shown in FIGS. 3 to 7 and like parts are denoted by like numerals. The boroscope 160 differs in that the mirror 82 is not mounted on the working head 168 by a gimballed mounting 84, but instead the mirror 82 is mounted on a micro-electro-mechanical systems (MEMS) 184 chip. The micro-electro-mechanical systems (MEMS) 184 chip is able to rotate, or tilt, about two perpendicular axes like the gimballed mounting 84 in order to rotate the mirror 82 about one or the other or both of the axes of rotation X and Y of the MEMS chip 184 and electrical cables 198 extend through the hollow member 62 from the first end 62 to the MEMS chip 184. The mirror 82 is nominally arranged at 45° to the axis of the at least one lens 80 and the MEMS chip 184 is arranged to change the angle of the mirror 82 relative to the axis of the at least one lens 80. The mirror 82 is provided with a reflective coating which has greater reflective properties to the frequency of laser beam transmitted through the third optical fibre 78 to reduce the possibility of overheating of the mirror 82 and hence the MEMS chip 184. Thus the MEMS mounting 184 provides an adjustable mounting which is arranged to change the angle of the mirror 82 relative to the axis of the at least one lens 80. The adjustable mounting, the MEMS mounting, 184 comprises two perpendicular axes of rotation X and Y and the mirror 82 is rotatable about the two axes of rotation X and Y. The MEMS chip 184 also enables the mirror 82 to be operated sufficiently quickly to provide laser processing of the surface of the component.

In operation of the boroscope 162 the laser beam transmitted through the third optical fibre 78 is interrupted periodically, after preset time intervals, to allow the mirror 82 and hence the MEMS chip 184 to cool down. For example in operation the laser beam is transmitted through the third optical fibre for a time period of 10 seconds and then interrupted for a time period of several seconds, e.g. 1 to 3 seconds, and then the laser beam is transmitted though the third optical fibre for a time period of 10 seconds etc. Other suitable times may be used for transmission and interruption of the laser beam.

The boroscope of the present invention allows the translation of a laser focal point around a component within the gas turbine engine, or other engine, machine or apparatus, without having to move the working head of the boroscope. The working head of the baroscope enables accurate control of a laser beam for laser processing of a component within the gas turbine engine, or other engine, machine or apparatus, without having to move the working head of the boroscope.

In an alternative boroscope, not shown, the first optical fibre 74 surrounds the laser optical fibre 78 and provides a cladding for the laser optical fibre 78.

The boroscope may be used in gas turbine engines, steam turbines, internal combustion engines, diesel engines, aircraft engines, ship engines, locomotive engines, nuclear reactors, construction sites, aircraft, ships, trains etc.

The invention claimed is:
1. A boroscope comprising
a flexible hollow member having a first end and a second end,
a working head being arranged at the second end of the hollow member, the working head having a first end adjacent the second end of the hollow member and a second end remote from the hollow member,
a mirror being mounted on the working head by an adjustable mounting,
a first light source arranged at a position between the first end and the second end of the working head, the first light source is arranged to direct light with a component of direction transverse to the axis of the hollow member of the boroscope,
a first optical fiber extending through the hollow member from the first end of the hollow member to a position between the first end and the second end of the working head, the first optical fiber has an end between the first end and the second end of the working head, the end of the first optical fiber is arranged to receive light travelling with a component of direction transverse to the axis of the hollow member of the boroscope,
a second light source arranged at the second end of the working head, the second light source is arranged to direct light with a component of direction parallel to the axis of the hollow member of the boroscope, a second optical fiber extending through the hollow member and the working head from the first end of the hollow member to the second end of the working head, the second optical fiber has an end at the second end of the working head, the end of the second optical fiber is arranged to receive light travelling with a component of direction parallel to the axis of the hollow member of the boroscope, a laser optical fiber extending through the hollow member from the first end to the second end of the hollow member, the laser optical fiber being arranged to direct laser light transmitted through the laser optical fiber onto the mirror on the working head, and an actuator device to adjust the position of the mirror, the adjustable mounting comprising two perpendicular axes of rotation and the mirror being rotatable about the two axes of rotation, the adjustable mounting comprising a micro-electro-mechanical system and the actuator device comprising the micro-electro-mechanical system.

2. The boroscope as claimed in claim 1 wherein at least one lens is arranged between the first end and the second end of the working head, and the laser optical fiber is arranged to direct laser light transmitted through the laser optical fiber onto the at least one lens within the working head and then onto the mirror on the working head.

3. The boroscope as claimed in claim 1 wherein the mirror is adjustably mounted to the second end of the working head.

4. The boroscope as claimed in claim 1 wherein the first light source and the second light source each comprise a light emitting diode.

5. The boroscope as claimed in claim 1 wherein a pipe extends through the boroscope to a position between the first and second ends of the working head and a device is arranged to supply powder material through the pipe.

6. The boroscope as claimed in claim 1 wherein the first optical fiber surrounds the laser optical fiber and provides a cladding for the laser optical fiber.

7. The boroscope as claimed in claim 1 wherein the working head comprises a first cylindrical portion at the first end of the working head, a second part cylindrical portion at the second end of the working head and a third portion interconnecting the first cylindrical portion and the second part cylindrical portion.

8. The boroscope as claimed in claim 4 wherein the first light source and at least one lens are arranged in the first cylindrical portion, and the second light source and the mirror are arranged on the second part cylindrical portion.

9. The boroscope as claimed in claim 1 wherein the working head comprises a first cylindrical portion at the first end of the working head, a second part cylindrical portion at the second end of the working head and a third portion interconnecting the first cylindrical portion and the second part cylindrical portion, the first light source, the end of the first optical fiber and at least one lens are arranged in the first cylindrical portion, and the second light source, the end of the second optical fiber and the mirror are arranged in the second part cylindrical portion.

10. The boroscope as claimed in claim 9 wherein the first cylindrical portion comprises a cylindrical wall, the first light source is provided in an aperture in the first cylindrical wall, the end of the first optical fiber is provided in an aperture in the first cylindrical wall, the second part cylindrical portion comprises a part cylindrical wall and a part circular end wall, the second light source is provided in an aperture in the part circular end wall and the end of the second optical fiber is provided in an aperture in the part circular end wall.

11. A boroscope comprising
a flexible hollow member having a first end and a second end,
a working head being arranged at the second end of the hollow member, the working head having a first end adjacent the second end of the hollow member and a second end remote from the hollow member,
a mirror being mounted on the working head by an adjustable mounting,
a first light source arranged at a position between the first end and the second end of the working head, the first light source is arranged to direct light with a component of direction transverse to the axis of the hollow member of the boroscope,
a first optical fiber extending through the hollow member from the first end of the hollow member to a position between the first end and the second end of the working head, the first optical fiber has an end between the first end and the second end of the working head, the end of the first optical fiber is arranged to receive light travelling with a component of direction transverse to the axis of the hollow member of the boroscope,
a second light source arranged at the second end of the working head, the second light source is arranged to direct light with a component of direction parallel to the axis of the hollow member of the boroscope,
a second optical fiber extending through the hollow member and the working head from the first end of the hollow member to the second end of the working head, the second optical fiber has an end at the second end of the working head, the end of the second optical fiber is arranged to receive light travelling with a component of direction parallel to the axis of the hollow member of the boroscope,
a laser optical fiber extending through the hollow member from the first end to the second end of the hollow member, the laser optical fiber being arranged to direct laser light transmitted through the laser optical fiber onto the mirror on the working head, and
an actuator device to adjust the position of the mirror, the adjustable mounting comprising two perpendicular axes of rotation and the mirror being rotatable about the two axes of rotation, the adjustable mounting comprising a gimballed mounting and the actuator device comprising a galvanometer mechanism.

12. The boroscope as claimed in claim 11 wherein the mirror is circular and has a diameter, the gimballed mounting comprises a C-shaped member having ends, the mirror is rotatably mounted about its diameter between the ends of the C-shaped member and the C-shaped member is rotatably mounted to the working head.

13. The boroscope as claimed in claim 11 wherein electrical cables extend through the hollow member from the first end of the hollow member to a respective galvanometer mechanism.

14. The boroscope as claimed in claim 11 wherein electrical cables extend through the hollow member from the first end of the hollow member to the first and second light sources.

15. A boroscope comprising
a flexible hollow member having a first end and a second end,
a working head being arranged at the second end of the hollow member, the working head having a first end adjacent the second end of the hollow member and a second end remote from the hollow member, a mirror being mounted on the working head by an adjustable mounting, a first light source arranged at a position between the first end and the second end of the working head, the first light source is arranged to direct light with a component of direction transverse to the axis of the hollow member of the boroscope, a first optical fiber extending through the hollow member from the first end of the hollow member to a position between the first end and the second end of the working head, the first optical fiber has an end between the first end and the second end of the working head, the end of the first optical fiber is arranged to receive light travelling with a component of direction transverse to the axis of the hollow member of the boroscope, a second light source arranged at the second end of the working head, the second light source is arranged to direct light with a component of direction parallel to the axis of the hollow member of the boroscope, a second optical fiber extending through the hollow member and the working head from the first end of the hollow member to the second end of the working head, the second optical fiber has an end at the second end of the working head, the end of the second optical fiber is arranged to receive light travelling with a component of direction parallel to the axis of the hollow member of the boroscope, a laser optical fiber extending through the hollow member from the first end to the second end of the hollow member, the laser optical fiber being arranged to direct laser light transmitted through the laser optical fiber onto the mirror on the working head, and an actuator device to adjust the position of the mirror, the adjustable mounting comprising two perpendicular axes of rotation and the mirror being rotatable about the two axes of rotation, wherein a pipe extends through the boroscope to a position between the first and second ends of the working head and a device is arranged to supply powder material through the pipe, and the first light source and the second light source each comprise a light emitting diode.

* * * * *